(12) United States Patent
Varshney et al.

(10) Patent No.: US 11,379,333 B2
(45) Date of Patent: Jul. 5, 2022

(54) MANAGING NOTIFICATIONS ACROSS ECOSYSTEMS

(71) Applicant: Dell Products L.P., Round Rock, TX (US)

(72) Inventors: Vishal Varshney, Austin, TX (US); Keith M. Alfano, Manor, TX (US)

(73) Assignee: Dell Products L.P., Round Rock, TX (US)

( * ) Notice: Subject to any disclaimer, the term of this patent is extended or adjusted under 35 U.S.C. 154(b) by 40 days.

(21) Appl. No.: 17/018,164

(22) Filed: Sep. 11, 2020

(65) Prior Publication Data

US 2022/0083440 A1 Mar. 17, 2022

(51) Int. Cl.
| | |
|---|---|
| G06F 11/30 | (2006.01) |
| G06N 20/00 | (2019.01) |
| G06F 9/451 | (2018.01) |
| G06F 9/54 | (2006.01) |
| G06F 11/32 | (2006.01) |

(52) U.S. Cl.
CPC .......... *G06F 11/3072* (2013.01); *G06F 9/451* (2018.02); *G06F 9/542* (2013.01); *G06F 11/3006* (2013.01); *G06F 11/328* (2013.01); *G06N 20/00* (2019.01)

(58) Field of Classification Search
CPC . G06N 20/00; G06F 11/3072; G06F 11/3006; G06F 9/542; G06F 11/328; G06F 9/541
See application file for complete search history.

(56) References Cited

U.S. PATENT DOCUMENTS

| | | | |
|---|---|---|---|
| 2003/0012181 A1* | 1/2003 | The ...................... | H04L 69/16 370/352 |
| 2005/0172323 A1* | 8/2005 | Yang ................... | H04N 7/17318 725/109 |
| 2009/0271486 A1* | 10/2009 | Ligh ................... | G06F 3/04886 709/206 |
| 2010/0037237 A1* | 2/2010 | Reinart .................. | G06F 9/541 719/313 |
| 2010/0169114 A1* | 7/2010 | Henderson ............. | G06Q 10/00 705/2 |
| 2013/0212047 A1* | 8/2013 | Lai ....................... | G06Q 10/107 706/12 |
| 2014/0205990 A1* | 7/2014 | Wellman .................. | G09B 7/00 434/362 |

(Continued)

*Primary Examiner* — Tuan C Dao
(74) *Attorney, Agent, or Firm* — Kirton McConkie; Brian Tucker

(57) ABSTRACT

Notifications can be managed across ecosystems. A centralized hub can implement a learning engine that uses an algorithm to evaluate incoming notifications that are intended for a user that uses multiple computing devices having different ecosystems. The algorithm can be configured to determine on which of the user's computing devices the notifications should be presented given a particular context. Agents executing on the user's computing devices can monitor how the user interacts with the notifications and provide indications of such interactions to the learning engine. The learning engine can then update its algorithm based on the user's interactions to cause future notifications to be delivered to the user via the ecosystem that is most appropriate for a given context in which each notification is received.

17 Claims, 8 Drawing Sheets

(56) References Cited

U.S. PATENT DOCUMENTS

| | | | |
|---|---|---|---|
| 2015/0278764 A1* | 10/2015 | Patil | G06F 16/93 |
| | | | 705/301 |
| 2016/0063077 A1* | 3/2016 | Pyke | G06F 16/25 |
| | | | 707/756 |
| 2016/0173431 A1* | 6/2016 | Harpur | G06Q 10/107 |
| | | | 709/206 |
| 2017/0104658 A1* | 4/2017 | Sykes | H04L 41/044 |
| 2018/0011972 A1* | 1/2018 | Rajan | G06F 16/24578 |
| 2018/0145842 A1* | 5/2018 | Golin | H04L 47/30 |
| 2018/0287988 A1* | 10/2018 | Van Dosselaer | H04L 51/26 |
| 2018/0349800 A1* | 12/2018 | Saba | H04L 67/306 |

* cited by examiner

| User-specific data structure(s) 112 | | User A | User B | ... |
|---|---|---|---|---|
| Ecosystem-related parameters | Computing device currently used? | | | |
| | Computing device available? | | | |
| | Proximity of computing device | | | |
| | Computing device being worn? | | | |
| | ... | | | |
| User interaction parameters | Selected? | | | |
| | Time to select | | | |
| | Selection method | | | |
| Notification metadata parameters | Sender | | | |
| | Priority | | | |
| | ... | | | |
| Environment parameters | Location | | | |
| | Sound Level | | | |
| Hardware context parameters | Camera on? | | | |
| | Docked? | | | |
| Software context parameters | Apps open | | | |
| | Foreground window | | | |
| ... | | | | |

FIG. 3

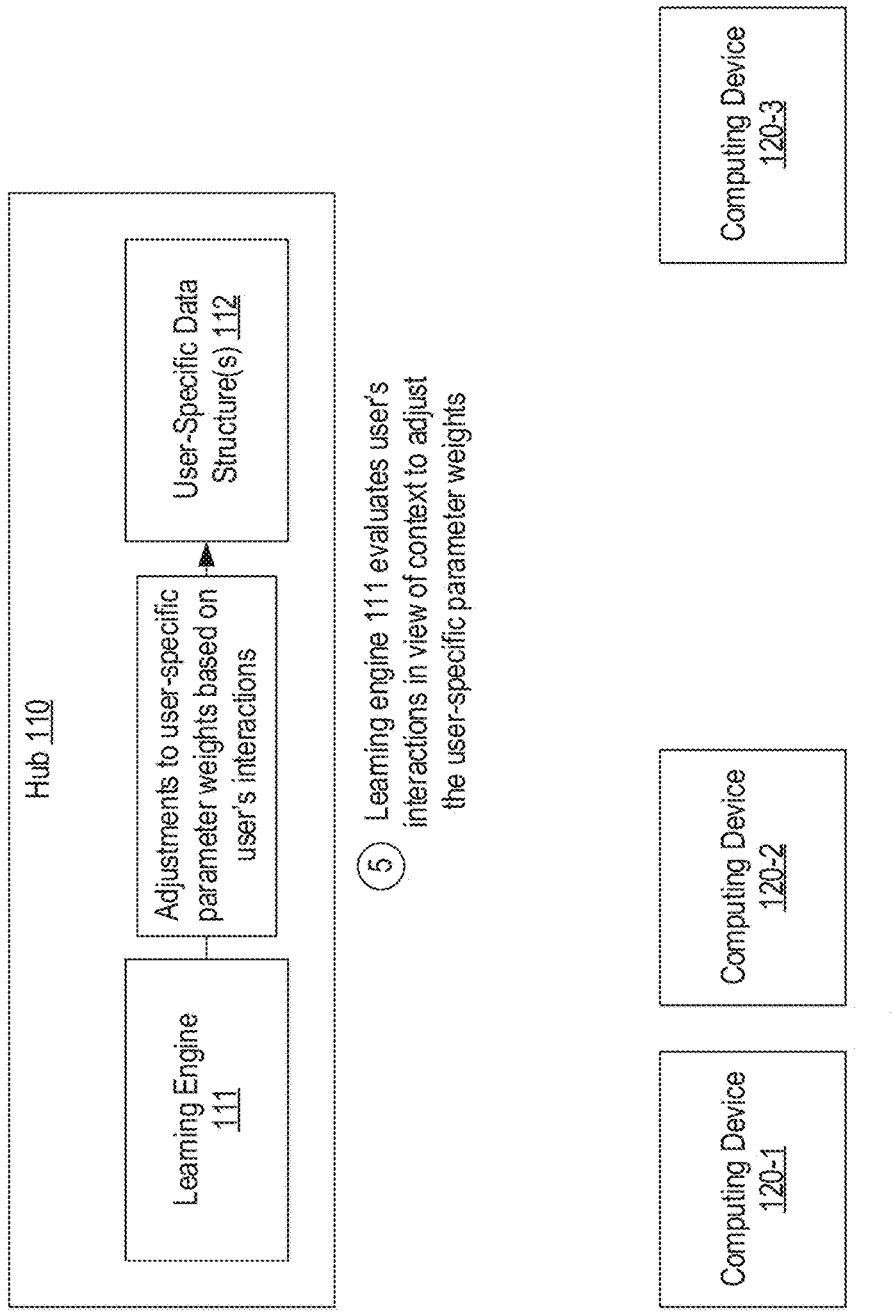

MANAGING NOTIFICATIONS ACROSS ECOSYSTEMS

CROSS-REFERENCE TO RELATED APPLICATIONS

N/A

BACKGROUND

Typically, an individual (or "user") will use, carry, wear or otherwise have access to multiple computing devices at any given time. Oftentimes, these computing devices may not be part of the same "ecosystem." For example, a user may use a Windows-based PC for work, an iOS or Android phone and any of a variety of tablets, personal assistant devices (e.g., an Amazon Echo, Google Home, Facebook Portal, etc.), smart watches, smart TVs, smart ear buds, smart glasses, etc. In this context, the term "ecosystem" can be viewed as an operating system environment on a computing device. Accordingly, computing devices that run different operating systems can be viewed as providing different ecosystems (e.g., a Windows ecosystem, an iOS ecosystem, an Android ecosystem, a Fire OS ecosystem, etc.).

It is also typical that each of a user's computing devices will be configured to present notifications. These notifications have proliferated making it tedious for a user to manage which notifications he or she would like to receive and when, where and how he or she may want to receive them. Although each ecosystem typically provides a way to silence notifications or customize how they are presented, it is oftentimes necessary for the user to manually update settings or preferences to do so. With the wide variety of notifications, such manual processes may be overly cumbersome. Furthermore, any customizations that the user may make to the management of notifications in one ecosystem likely will have no impact on any notifications that may be presented in another ecosystem. For example, if a user silences a particular type of notification on his or her iPhone, it likely will not impact how such notifications are presented on his or her PC.

BRIEF SUMMARY

The present invention extends to methods, systems, and computer program products for managing notifications across ecosystems. A centralized hub can implement a learning engine that uses an algorithm to evaluate incoming notifications that are intended for a user that uses multiple computing devices having different ecosystems. The algorithm can be configured to determine on which of the user's computing devices the notifications should be presented given a particular context. Agents executing on the user's computing devices can monitor how the user interacts with the notifications and provide indications of such interactions to the learning engine. The learning engine can then update its algorithm based on the user's interactions and other factors such as dynamic environmental changes, the identity of the sender, a location of the user, etc. to cause future notifications to be delivered to the user via the ecosystem that is most appropriate for a given context in which each notification is received.

In some embodiments, the present invention may be implemented by a hub that interfaces with agents executing on a plurality of computing devices having different ecosystems as a method for managing notifications across the ecosystems. The hub may receive a notification that is intended for a user that uses the plurality of computing devices having different ecosystems. The hub can employ a learning engine to evaluate the notification. Based on the evaluation, the hub can determine that the notification should be presented to the user on a first computing device of the plurality of computing devices. Based on the determination, the hub can deliver the notification to the first computing device.

In some embodiments, the present invention may be implemented as a computer storage media storing computer executable instructions which when executed implement a hub that is configured to perform a method for managing notifications across ecosystems. The hub may maintain a learning engine that implements an algorithm for determining how to deliver notifications to a user that uses a plurality of computing devices having different ecosystems. In response to receiving notifications intended for the user, the hub may apply the weighted algorithm to the notifications to selectively deliver the notifications to the plurality of computing devices. In response to receiving indications of how the user interacted with or responded to the notifications, the hub may update the algorithm.

In some embodiments, the present invention may be implemented as computer storage media storing computer executable instructions which when executed implement a learning engine that implements an algorithm for determining how to deliver notifications to a user that uses a plurality of computing devices having different ecosystems and an agent on each of the plurality of computing devices. The agents may be configured to monitor the user's interactions with the notifications and provide indications of the user's interactions to the learning engine. The learning engine may update the algorithm in response to the user's interactions with the notifications.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 3 provides an example of a user-specific data structure that a learning engine of the hub can employ to manage notifications across ecosystems; and FIGS. 4A-4E provide an example of how notifications can be managed across ecosystems.

DETAILED DESCRIPTION

Figure 1:
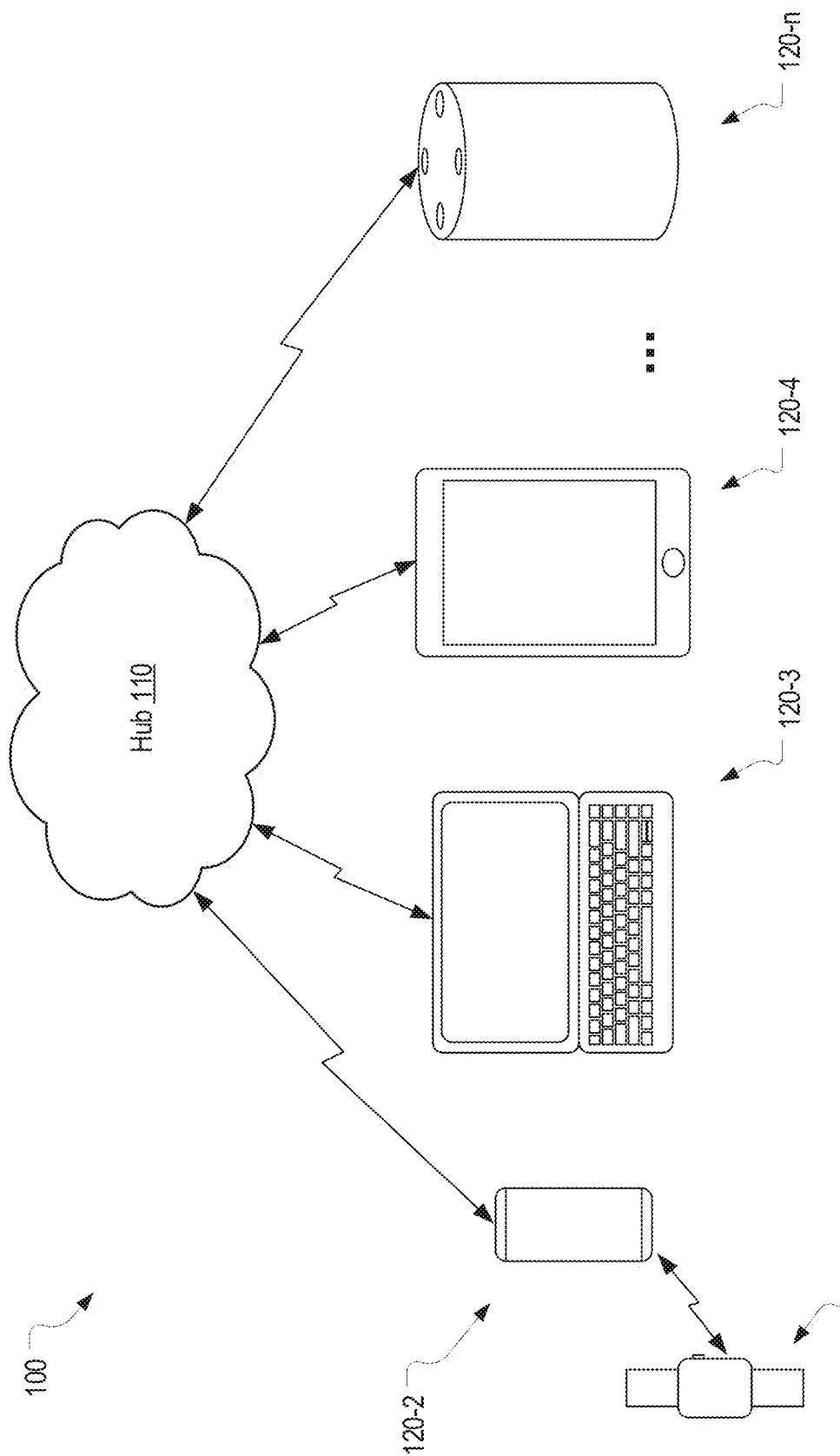
FIG. 1 illustrates an example computing environment in which embodiments of the present invention may be implemented.

FIG. 1 illustrates an example computing environment 100 in which embodiments of the present invention may be implemented. Computing environment 100 includes a hub 110 which could be hosted in the cloud and a number of computing devices 120-1 through 120-n (generally computing device(s) 120). Computing devices 120 are intended to represent the computing devices that a single user may use such as a watch (120-1), a smart phone (120-2), a laptop (120-3), a tablet (120-4) and a smart device (120-n). Each of computing devices 120 may include an agent that is configured to interface with hub 110 to perform various functionality to enable notifications to be managed across ecosystems. In some cases, the agent on one computing device 120 (e.g., watch 120-1) may interface with hub 110 via the agent on another computing device 120 (e.g., smart phone 120-2). Although not shown, an agent may also be employed within a browser ecosystem in some embodiments.

It is noted that embodiments of the present invention may be implemented regardless of the number of computing devices 120 a particular user may use. For example, a user may use two computing devices 120 that interface with hub 110 as described herein. Some aspects of the present invention may also be implemented when a user uses only a single computing device 120.

Figure 2:
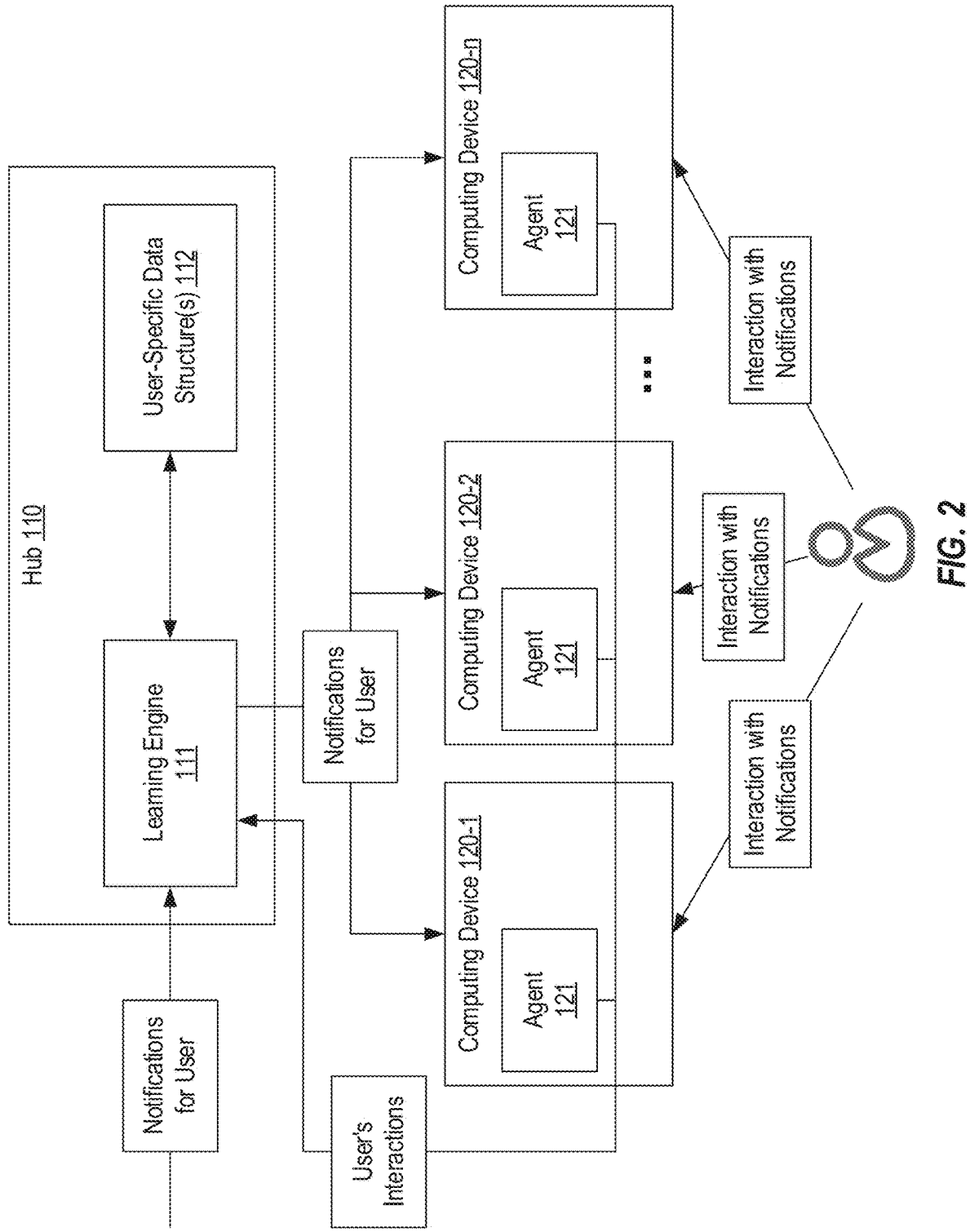
FIG. 2 provides an example of how a centralized hub can interface with agents in a variety of ecosystems to allow the hub to manage notifications across the ecosystems.

FIG. 2 provides an overview of how hub 110 and an agent 121 on each of computing devices 120 may interact in some embodiments of the present invention. As shown, hub 110 may include a learning engine 111 and user-specific data structures 112. Learning engine 111 can be configured to receive notifications that are intended for a user of computing devices 120 and evaluate them against user-specific data structures 112 to determine how to present them to the user, including determining if and/or how the notification should be presented in a particular ecosystem. These notifications could originate from any source including applications that may be executing on computing devices 120. Examples of notifications include communication-related notifications such as emails, text messages and phone calls, schedule-related notifications such as alarms and reminders, social-media-related notifications such as posts and friend requests or any of the many other types of notifications that may be generated for the user.

The manner in which hub 110 receives the notifications is not essential to the present invention and any technique can be employed to route notifications to hub 110 before they are presented to the user. For example, in some embodiments or with some sources of notifications, agent 121 could be configured to intercept notifications that are generated on computing device 120 and route them to hub 110 as opposed to allowing the notifications to be presented directly on computing device 120. As another example, in some embodiments or with some sources of notifications, agent 121 could be or form part of a notification subsystem on a computing device 120 and may therefore interface directly with the sources of notifications. In some embodiments, a source of notifications could interface directly with hub 110 to provide notifications that target the user.

As one particular and non-limiting example, the user may utilize Outlook to access emails on multiple computing devices 120. In such a case, an instance of Outlook may be configured to generate notifications on each of these computing devices when emails are received. The instance of agent 121 on each of these computing devices 121 may be configured to "suppress" the email notifications and instead route them to hub 110.

When learning engine 111 causes a notification to be presented on any of computing devices 120, the instance of agent 121 on the computing device 120 on which the notification is displayed can monitor for user interaction with the notification. Agent 121 can then relay information about the user's interactions to learning engine 111. Learning engine 111 can employ such information to update user-specific data structures 112. It is reiterated that computing devices 120 may typically span multiple ecosystems. Accordingly, learning engine 111 can learn from the user's interactions with notifications presented across ecosystems how to best route/present future notifications.

FIG. 3 provides a generalized example of how user-specific data structures 112 may define various parameters that learning engine 111 may employ in determining how to present a notification to a particular user. FIG. 3 also represents an example of user-specific parameter weights that learning engine 111 can dynamically adjust based on a user's interaction with previous notifications. In other words, learning engine 111 can employ a weighted algorithm to determine how to present a notification to a user where the weights are dynamically adjusted over time based on how the user interacts with notifications in a multi-ecosystem environment.

In FIG. 3, user-specific data structures 112 are depicted in the form of a table for illustrative purposes only. User-specific data structures 112 could be in any suitable form that allows user-specific weights to be associated with the various parameters that learning engine 111 may employ. FIG. 3 represents that many different categories of parameters could be employed including, for example, ecosystem-related parameters, user interaction parameters, notification metadata parameters, environment parameters, hardware context parameters, software context parameters, time parameters, etc.

Ecosystem-related parameters can represent any parameter that is related to the various ecosystems of computing devices 120 that the user may employ. For example, the ecosystem-related parameters could include a parameter defining whether the user is using a particular computing device, a parameter defining whether a particular computing device is available, a parameter defining the proximity of a particular computing device to another computing device, a parameter defining whether the user is wearing a particular computing device, etc.

User interaction parameters can represent any parameter that is related to how the user has interacted with previous notifications. For example, the user interaction parameters may include parameters defining whether the user selected/dismissed/silenced a particular type of notification, how long it took for the user to select/dismiss/silence a particular type of notification, how the user selected/dismissed/silenced the particular type of notification, etc.

Notification metadata parameters can represent any parameter that is related to a characteristic of a notification. For example, notification metadata parameters may include parameters defining an identity of a sender of the notification (e.g., an app vs. a human), an identification of the sender, a relationship of the sender to the user, a priority of the notification (e.g., sender-tagged priority or a priority determined through analysis of the notification), a frequency of notifications of this type, multimedia attributes of the notification, etc.

Environment parameters can represent any parameter that is related to an environment in which the user may be currently located. For example, environment parameters may include parameters that define a location of the user, a sound level (e.g., whether the user is in a noisy or quiet environment), a proximity to other individuals, etc.

Hardware context parameters can represent any parameter that is related to a hardware context of any of computing devices 120. For example, hardware context parameters may include parameters defining whether a camera is on, whether a computing device is docked, whether a computing device is connected to an external display, whether a proximity sensor is active, etc.

Software context parameters can represent any parameter that is related to a software context of any of computing devices 120. For example, software context parameters may include parameters defining a security profile of a computing device, applications that are opened on a computing device, which application's window is the foreground window, whether any application is in full-screen mode, which processes are running in the background, a user-specified status, etc.

Time parameters can represent any parameter that is related to time. For example, time parameters may include a day of the week, a time of day, the user's schedule, etc.

These parameters are intended to be examples only. Learning engine 111 may employ any suitable parameter that may be useful in determining how to best present notifications across ecosystems. Of primary importance is that learning engine 111 can associate user-specific parameter weights to any parameters that it may use. Also of importance is that these user-specific parameter weights can dictate in which of possibly many ecosystems a user may receive a notification for any particular context. The weight of any individual parameter can represent the magnitude of the parameters influence when determining how to present a current notification. For example, the relative weights of multiple parameters can dictate on which of the user's computing devices 120 a particular notification will be presented and how the particular notification will be presented. In other words, the relative weights can cause notifications to be presented in the ecosystem that is the most appropriate at any given time and for any particular context.

FIGS. 4A-4E provide an example of how hub 110 and agents 121 may interoperate to manage notifications across ecosystems. In this example, it is assumed that the user has three computing devices 120-1 (a smart watch), 120-2 (a smart phone) and 120-3 (a laptop).

Figure 4A:
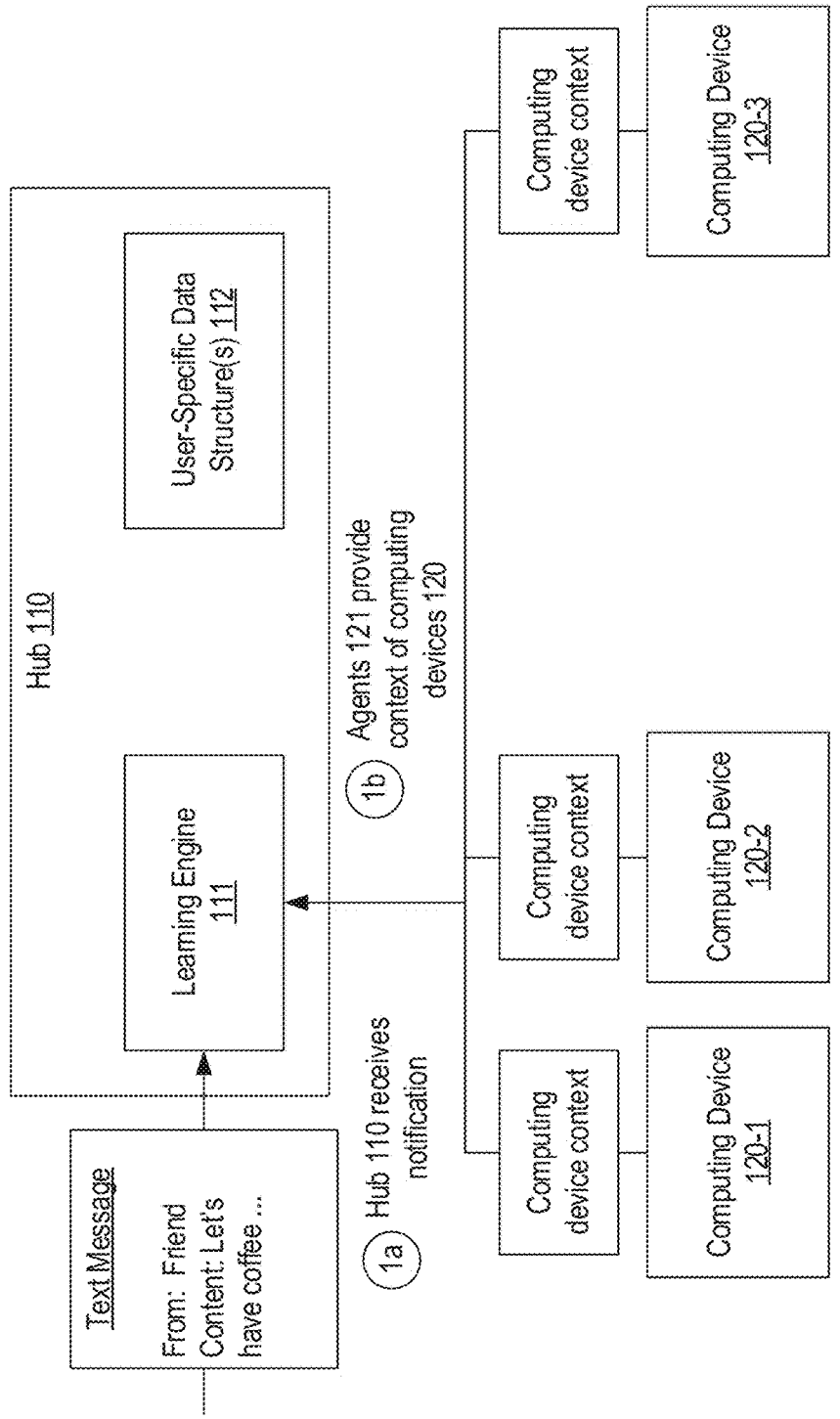

Turning to FIG. 4A, in step 1*a*, it is assumed that hub 110 receives a text message for the user. This text message is from a friend that is asking the user if he wants to have coffee. In conjunction with receiving the text message, in step 1*b*, learning engine 111 may also receive the current context of computing devices 120-1 through 120-3 from the respective agents 121. Agents 121 could be configured to provide such context periodically, in response to a request from hub 110 or in any other suitable manner.

This current context could correspond with the various non-notification-specific parameters described above such as ecosystem parameters, environment parameters, hardware context parameters, software context parameters, time parameters, etc. For example, the context reported by agent 121 on computing device 120-2 (the user's phone) could indicate that the phone is on but turned over, provide a current location and identify that the user is in a meeting, the context reported by agent 121 on computing device 120-1 (the user's watch) could indicate that the user is wearing the watch and that the watch is able to communicate with hub 110 and the context reported by agent 121 on computing device 120-3 (the user's laptop) could indicate that the laptop is locked and the user is not nearby.

Figure 4B:
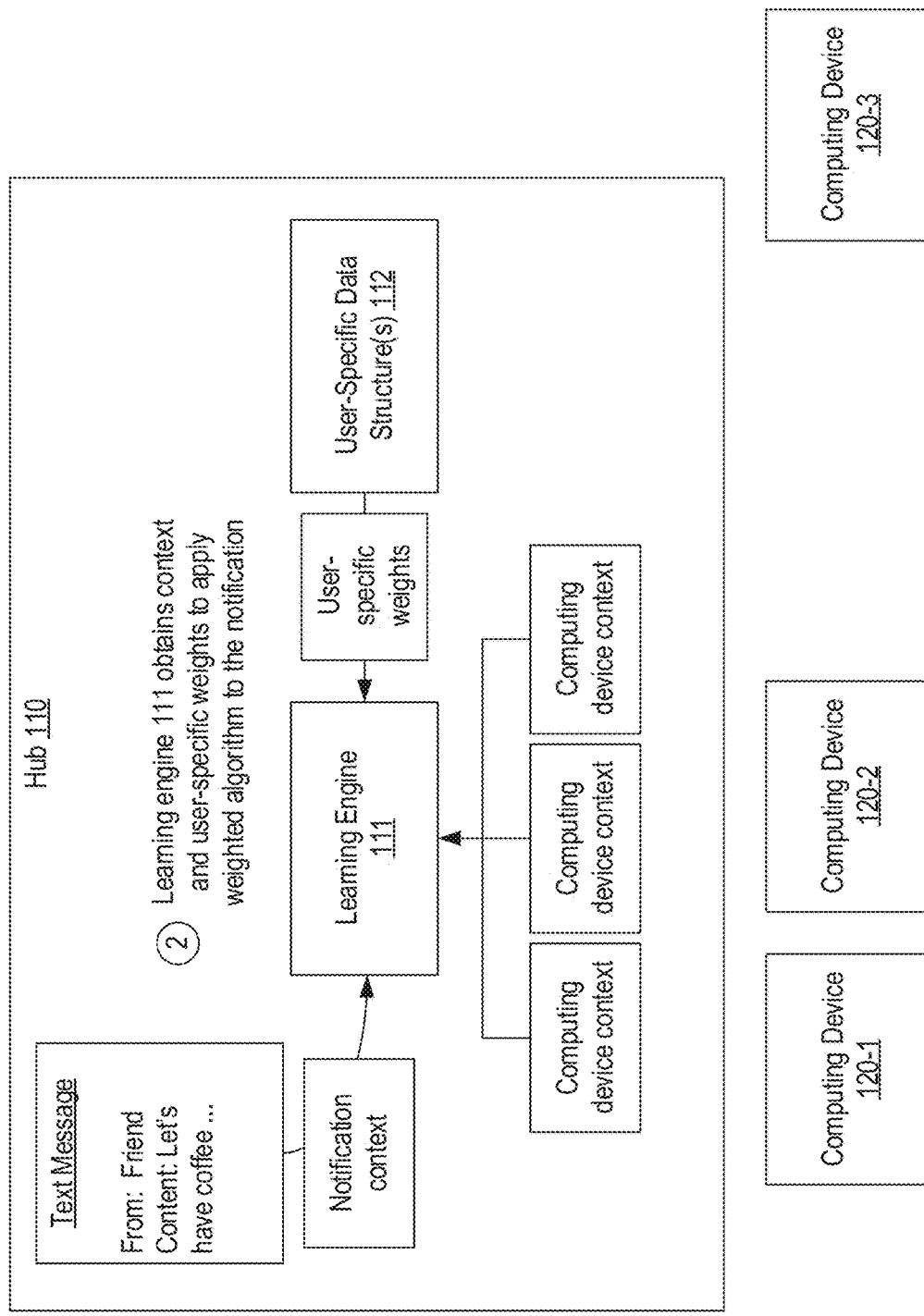

Turning to FIG. 4B, in step 2, learning engine 111 can obtain the context provided by agents 121, the context of the notification (e.g., the context corresponding to the notification metadata parameters described above) and the user-specific parameter weights. Learning engine can employ such context and the user-specific parameter weights to apply the weighted algorithm to the notification to thereby determine how to present a notification of the text message to the user. Notably, this determination can be made in the context of the user having three different computing devices which could present the notification.

As an example, based on how the user has previously interacted with notifications in similar contexts, learning engine 111 may have assigned a higher weight to a parameter defining whether the user is using computing device 120-3 when a notification is received. Of course, implementations of learning engine 111 would likely employ a complex weighted algorithm that considers many parameters in a variety of contexts.

Although not specifically represented in FIG. 4B, learning engine 111's application of the weighted algorithm to a notification may determine not only on which computing device(s) 120 the notification should be presented but how the notification should be presented on each computing device. For example, the application of the weighted algorithm may dictate that a notification should be delivered silently to a particular computing device 120, should be delivered to multiple computing devices 120 in a particular order, should be delivered to a particular computing device after a certain delay or after determining whether the user interacted with the notification on another computing device, etc.

Figure 4C:
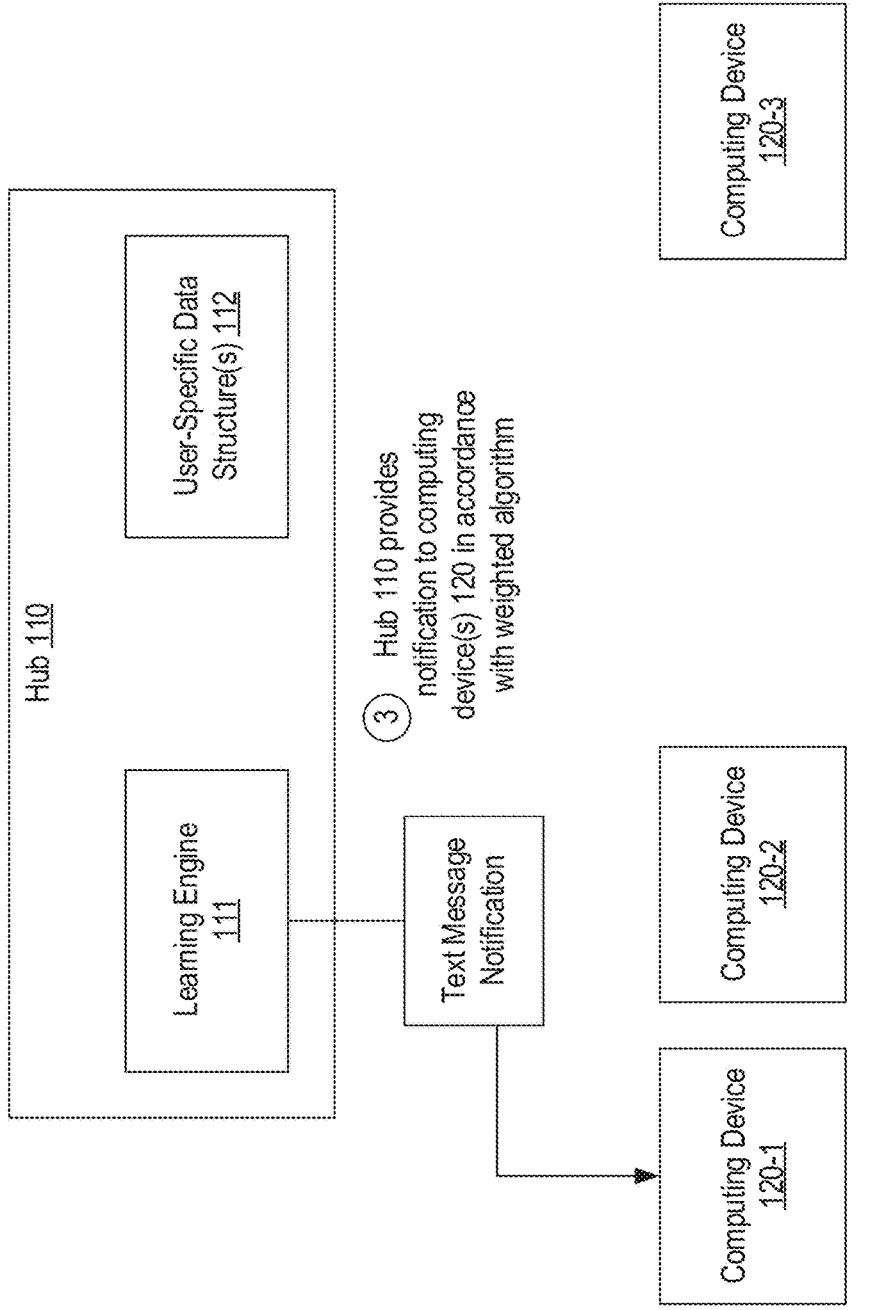

Turning to FIG. 4C, in step 3, hub 110 can provide the notification to the user's computing device(s) 120 in accordance with the outcome of applying the weighted algorithm to the notification. For example, FIG. 4C represents a scenario where learning engine 111 may have determined that the notification for the text message should only be presented on computing device 120-1. In some cases, this could be accomplished by sending the notification to agent 121 on computing device 120-2 with instructions to forego presenting it on computing device 120-2 while relaying it to agent 121 for display on computing device 120-1. As part of this process, learning engine 111 could also specify that sound should be suppressed when the notification is presented on computing device 120-1 or otherwise dictate how agent 121 on computing device 120-1 should present the notification to the user.

Figure 4D:
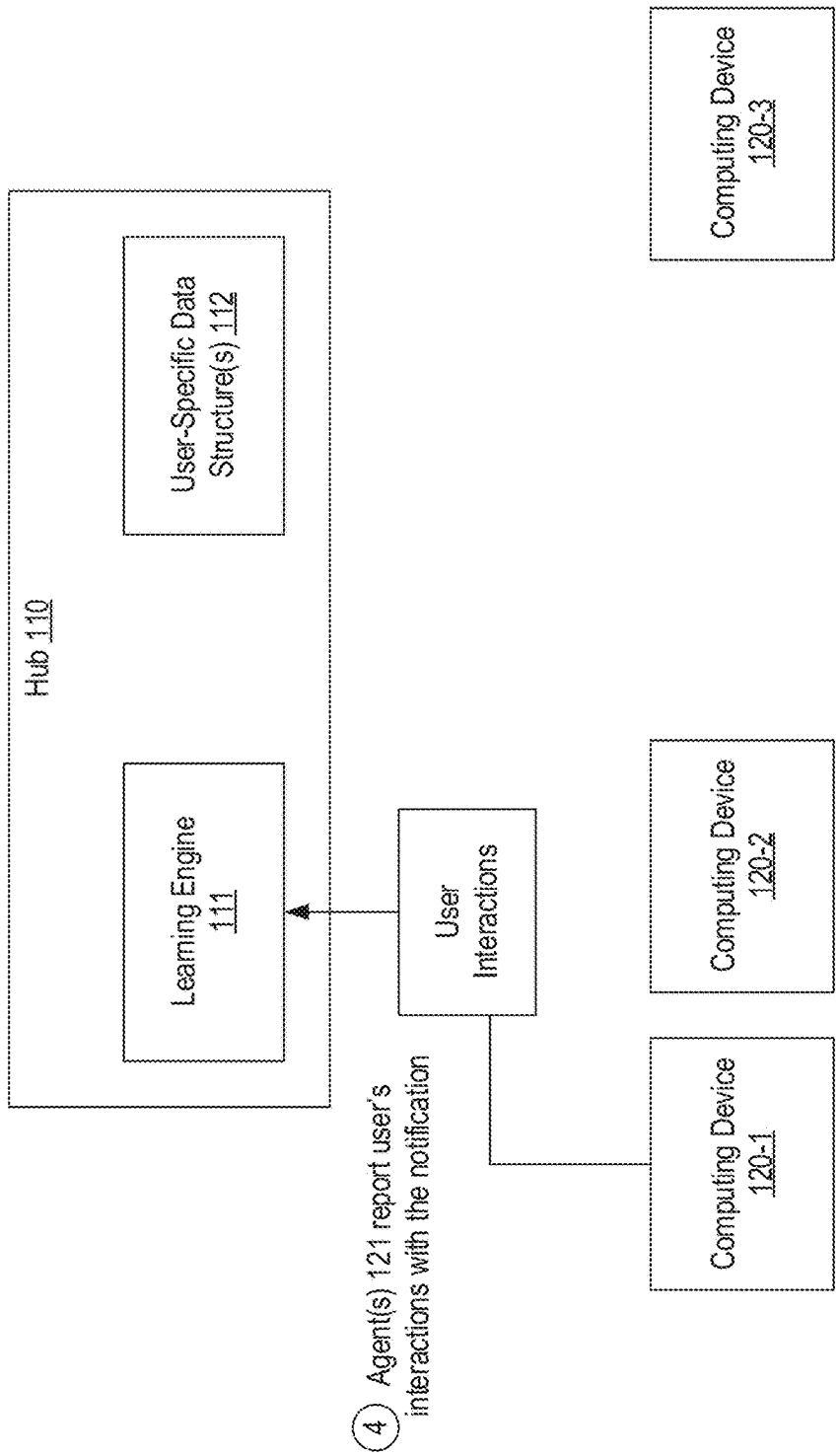

Turning to FIG. 4D, regardless of how the notification is presented to the user, agents 121 can monitor how the user may interact with or respond to the notification and report such interactions to learning engine 111. This monitoring may be performed by the instance of agent 121 on the computing device 120 with which the user interacts as well as by instances of agent 121 on other computing device(s) 120. For example, if the user quickly dismisses the notification when it is displayed on computing device 120-1, agent 121 on computing device 120-1 may notify learning engine 111 of this quick dismissal of the notification. Then, if the user quickly picks up computing device 120-2 to access an application that is the source of the notification, agent 121 on computing device 120-2 may notify learning engine 111 of this interaction.

Turning to FIG. 4E, in step 5 and in response to being notified of the user's interactions with the notification, learning engine 111 can calculate if/how the user-specific parameter weights should be adjusted to cause future notifications to be better presented to the user. For example, if the user quickly dismissed a notification on a first computing device to which it was delivered and immediately accessed a second computing device to review the notification, learning engine 111 could determine that, for the particular context of that notification, the user prefers receiving notifications in the ecosystem of the second computing device rather than in the ecosystem of the first computing device. In response, learning engine 111 could adjust the user-specific parameter weights to ensure that future notifications having the same or similar context will be presented to the user on the second computing device.

The process represented in FIGS. 4A-4E can be performed whenever hub 110 receives a notification for the user. Therefore, with each notification, learning engine 111 can learn how the user interacts with notifications across the different ecosystems of his or her computing devices and optimize the delivery and presentation of future notifications accordingly.

The following example is given to better emphasize how embodiments of the present invention can manage notifications across ecosystems. In a typical use case, a user may have a work computer, a phone and a watch, each of which may constitute a different ecosystem. The user may have a communications application installed on each of these computing devices (or at least have each computing device configured to present notifications from the communication application). For example, the user may receive Outlook notifications on his or her work computer (e.g., via the Windows Outlook application), phone (e.g., via the Outlook for iOS app) and watch (e.g., via the Apple Watch or Samsung Galaxy Watch version of Outlook which may or may not be linked to the user's phone). Without embodiments of the present invention, the user by default would receive a notification on all three of these computing devices whenever he or she received an email. To change this default behavior, the user would need to manually adjust settings on each of the computing devices, whether via the OS, the Outlook app or some other manner.

In contrast, with embodiments of the present invention, hub 110 and agents 121 on the three computing devices could implement the above-described functionality to learn over time how the user interacts with notifications presented in the three different ecosystems and customize how future notifications are presented. In some instances, the customizations can include selectively presenting a notification in one ecosystem while suppressing the notification in other ecosystems. In some instances, the customizations can include selectively ordering the presentation of the notification in the different ecosystems. In some instances, the customizations can include dynamically adjusting how the notification is presented in each ecosystem such as by silently delivering the notification to one ecosystem, presenting the notification in another ecosystem with audible output and presenting the notification in another ecosystem with vibration output. In short, learning engine 111 can manage how notifications are presented across ecosystems in a wide variety of ways based on a wide variety of contexts.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a hub that interfaces with agents executing on a plurality of computing devices having different ecosystems, for managing notifications across the ecosystems, the method comprising:

maintaining user-specific data structures which define a plurality of parameters and corresponding user-specific parameter weights for a plurality of users;

receiving a notification that is intended for a first user of the plurality of users that uses the plurality of computing devices having different ecosystems;

employing a learning engine to evaluate the notification against the user-specific parameter weights for the first user, wherein employing the learning engine to evaluate the notification comprises applying a weighted algorithm to the notification using the user-specific parameter weights for the user;

based on the evaluation, determining that the notification should be presented to the user on a first computing device of the plurality of computing devices;

based on the determination, delivering the notification to the first computing device;

in response to delivering the notification to the first computing device, receiving, from an agent executing on the first computing device, an indication of how the first user interacted with the notification; and in response to receiving the indication of how the first user interacted with the notification, updating the user-specific parameter weights for the first user.

2. The method of claim 1, wherein the plurality of computing devices having different ecosystems are computing devices having different operating systems.

3. The method of claim 1, wherein the plurality of computing devices having different ecosystems comprise at least two computing devices having different operating systems.

4. The method of claim 1, further comprising:
receiving, from an agent executing on one or more other computing devices of the plurality of computing devices, an indication of how the first user interacted with or responded to the notification;
in response to receiving the indication from the agent executing on the one or more other computing devices, updating the user-specific parameter weights for the first user.

5. The method of claim 1, wherein applying the weighted algorithm to the notification comprises applying the weighted algorithm to context reported by an agent on one or more of the plurality of computing devices.

6. The method of claim 5, wherein the context corresponds with ecosystem parameters employed in the weighted algorithm.

7. The method of claim 1, further comprising:
based on the evaluation, determining that the notification should also be presented to the first user on a second computing device of the plurality of computing devices; and
based on the determination, delivering the notification to the second computing device including specifying that the notification should be presented on the second computing device in a different manner than the notification is presented on the first computing device.

8. One or more computer storage media storing computer executable instructions which when executed implement a hub that is configured to interface with agents executing on a plurality of computing devices having different ecosystems and is configured to perform a method for managing notifications across the ecosystems, the method comprising:
receiving a notification that is intended for a user that uses the plurality of computing devices having different ecosystems;
employing a learning engine to evaluate the notification, wherein employing the learning engine to evaluate the notification comprises applying a weighted algorithm to the notification;
based on the evaluation, determining that the notification should be presented to the user on a first computing device of the plurality of computing devices, the first computing device having a first ecosystem,
based on the determination, delivering the notification to the first computing device;
in response to delivering the notification to the first computing device, receiving, from an agent executing on the first computing device, an indication of how the user interacted with the notification; and
in response to receiving the indication of how the user interacted with the notification, updating user-specific weighted parameters employed in the weighted algorithm.

9. The computer storage media of claim 8, wherein the method further comprises foregoing delivering the notification to a second computing device having a second ecosystem.

10. The computer storage media of claim 8, wherein the method further comprises delivering the notification to a second computing device having a second ecosystem after delivering the notification to the first computing device.

11. The computer storage media of claim 10, wherein the notification is delivered to the first computing device with an indication that the notification should be displayed in a first manner and the notification is delivered to the second computing device with an indication that the notification should be displayed in a second manner different from the first manner.

12. The computer storage media of claim 8, wherein the user-specific weighted parameters include user interaction parameters.

13. The computer storage media of claim 8, wherein the user-specific weighted parameters include one or more ecosystem-related parameters.

14. The computer storage media of claim 8, wherein the user-specific weighted parameters include: user interaction parameters; notification metadata parameters; environment parameters; hardware context parameters; software context parameters;
or time parameters.

15. A method, performed by a hub that interfaces with agents executing on a plurality of computing devices having different ecosystems, for managing notifications across the ecosystems, the method comprising:
receiving a notification that is intended for a user that uses the plurality of computing devices having different ecosystems;
employing a learning engine to evaluate the notification, wherein employing the learning engine to evaluate the notification comprises applying a weighted algorithm to the notification;
based on the evaluation, determining that the notification should be presented to the user on a first computing device of the plurality of computing devices;
based on the determination, delivering the notification to the first computing device;
in response to delivering the notification to the first computing device, receiving, from an agent executing on the first computing device, an indication of how the user interacted with the notification; and
in response to receiving the indication of how the user interacted with the notification, updating user-specific weighted parameters employed in the weighted algorithm.

16. The method of claim 15, further comprising:
receiving, from an agent executing on one or more other computing devices of the plurality of computing devices, an indication of how the user interacted with or responded to the notification;
in response to receiving the indication from the agent executing on the one or more other computing devices, updating the user-specific weighted parameters.

17. The method of claim 15, wherein applying the weighted algorithm to the notification comprises applying the weighted algorithm to context reported by an agent on one or more of the plurality of computing devices.

* * * * *